United States Patent
Wessells

[15] 3,697,124
[45] Oct. 10, 1972

[54] TORSION RESISTANT OPEN END AUTOMOBILE BODY

[72] Inventor: Henry W. Wessells, c/o The Budd Company 2450 Hunting Park Avenue, Philadelphia, Pa. 19132

[22] Filed: Dec. 29, 1970

[21] Appl. No.: 102,473

[52] U.S. Cl. ............................... 296/28 R, 296/106
[51] Int. Cl. ............................................. B62d 25/02
[58] Field of Search ........ 296/28 R, 28 F, 28 G, 28 J, 296/28 L, 31 R, 31 P, 106

[56] References Cited

UNITED STATES PATENTS

| | | |
|---|---|---|
| 2,254,458 | 9/1941 | Swallow .................... 296/28 R |
| 3,423,123 | 1/1969 | Wessells .................... 296/28 F |
| 2,929,528 | 3/1960 | Hoag et al ............... 296/106 X |
| 2,662,793 | 12/1953 | Lindsay .................... 296/28 F |
| 2,733,096 | 1/1956 | Waterhouse et al. .... 296/28 R |
| 3,541,668 | 11/1970 | Wessells et al ........... 296/28 R |

FOREIGN PATENTS OR APPLICATIONS

| | | |
|---|---|---|
| 620,526 | 3/1949 | Great Britain .......... 296/28 R |
| 626,305 | 7/1949 | Great Britain .......... 296/28 R |
| 998,506 | 9/1951 | France ..................... 296/28 R |

*Primary Examiner*—Benjamin Hersh
*Assistant Examiner*—Lesile J. Paperner
*Attorney*—Thomas I. Davenport, Edward M. Farrell, John D. Sowell, Alford Trueax, Jr. and William R. Nolte

[57] ABSTRACT

A unitized automobile body having a pair of hollow side frames connected to a floor panel and a roof panel. The rearward extensions of the side frames form hollow D-posts and hollow rear sills in the area over the rear wheel housings. The rear sills are connected by a deep rigid transverse rear panel. The forward extensions of the side frames form hollow A-posts and cowl side panels which are connected to a box-shaped rigid transverse panel formed by the cowl and firewall.

14 Claims, 13 Drawing Figures

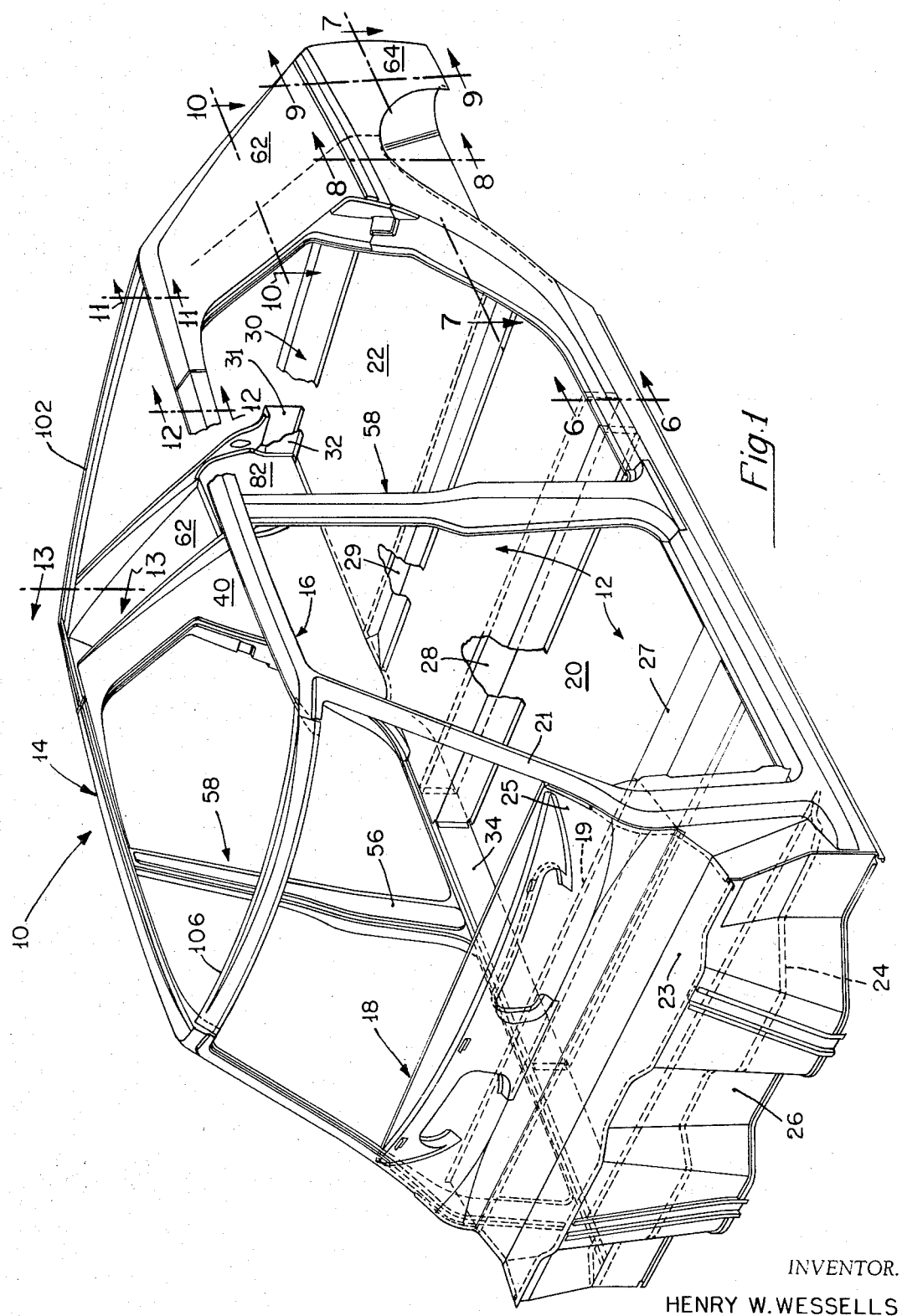

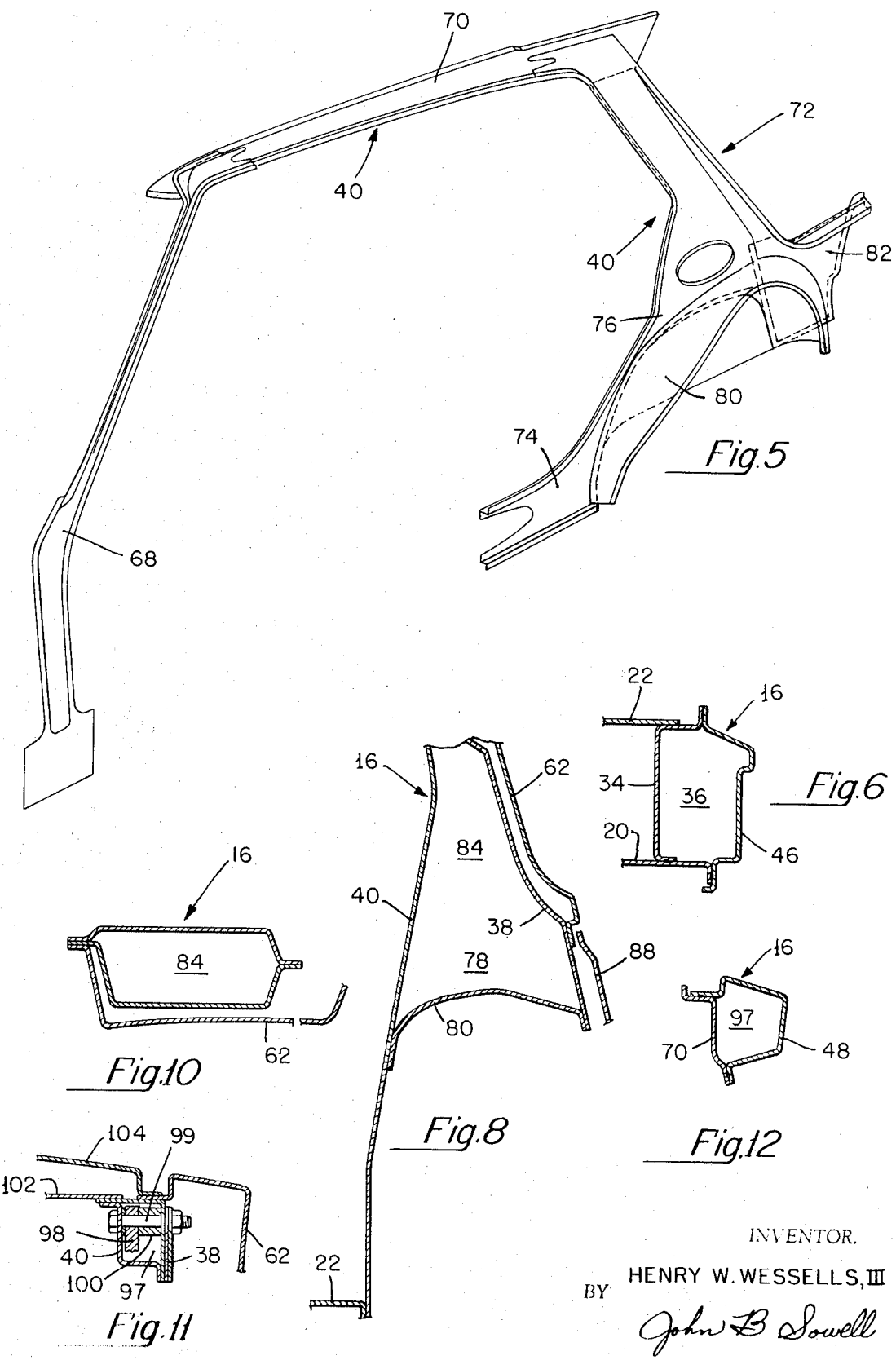

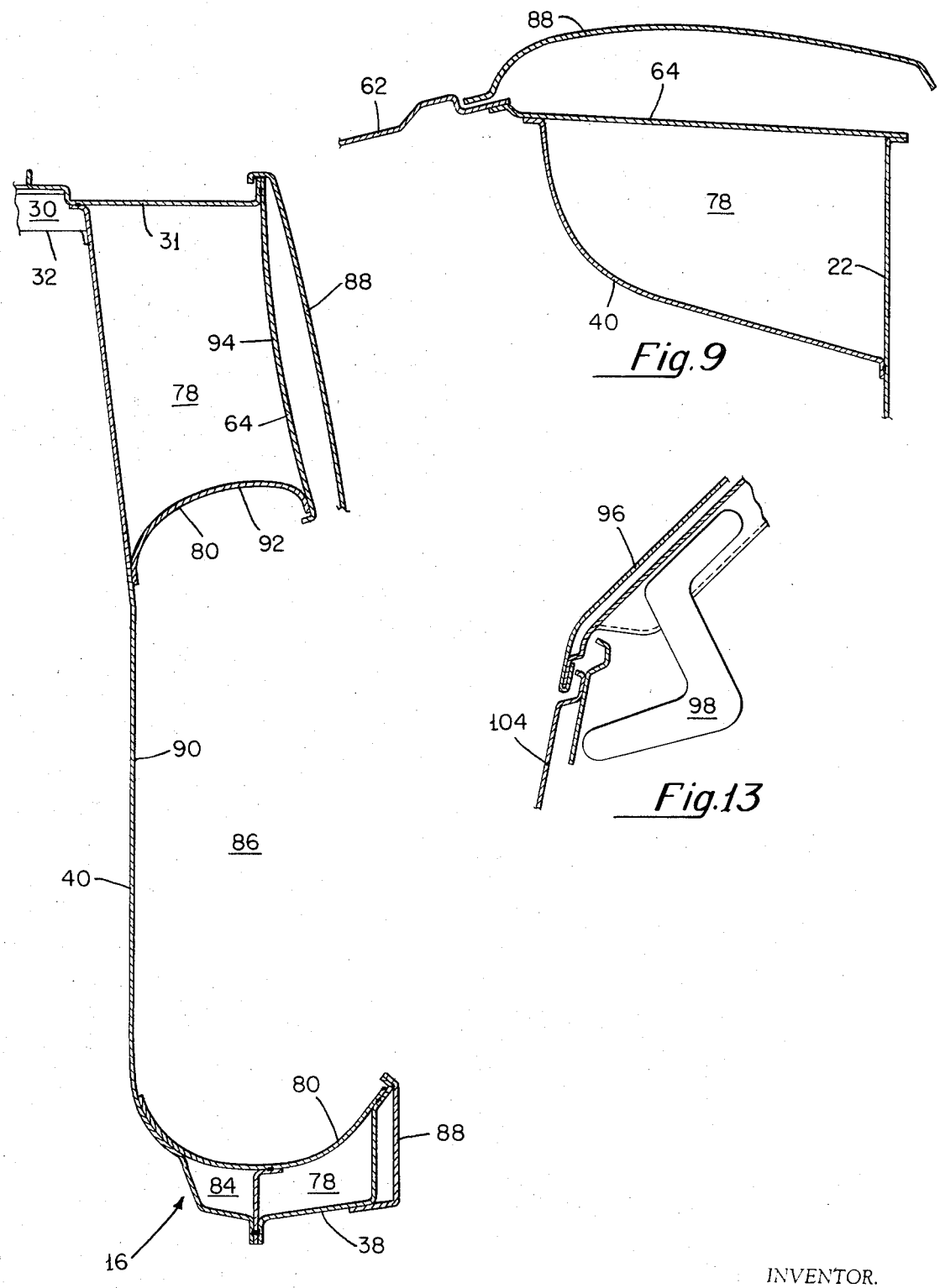

TORSION RESISTANT OPEN END AUTOMOBILE BODY

BACKGROUND OF THE INVENTION

It is generally recognized that major styling changes are more easily accomplished in automobiles having separate upper bodies and underframes. The underframe is designed as the major structural member and the upper body, when attached to the underframe, tends to stiffen and rigidify the underframe. Since the upper body is not the major structural member and does not absorb direct loads or road shock, it may be changed radically as a structure with little or no effect on the overall strength of the body, thus, automobile manufacturers standardize their underframes for use with several different body styles. A standard underframe employed in several body styles must be strong enough and rigid enough for use with the upper body which adds the least additional strength to the underframe.

Utilized automobile bodies, as the name implies, are made as a single underbody upper body unit without a structural underframe. Such bodies are both lighter and stronger than separate underframe automobiles because the outer and upper body panels are made as an integral part of the unitary body unit. Change in the outer body styling affects the strength of the body. It has been the general practice of automobile manufacturers to design separate utilized bodies for each body style.

SUMMARY OF THE INVENTION

It is the principal object of the present invention to provide a novel utilized automobile body structure adapted to be completed in more than one body style.

It is a primary object of the present invention to provide a unitized automobile body having novel side frames adapted to be interconnected at the front and rear by novel rigid transverse members connected to the floor panel.

It is a further object of the present invention to provide a novel side frame structure having a continuous open side sill, rear sill and D-post which extends rearward over the rear wheel housing.

It is another object of the present invention to provide a novel transverse rear panel which connects to the side frames forming an inverted arch therewith which provides substantial torsional stiffness to the automobile body.

It is another object of the present invention to provide a novel transverse cowl, firewall and windshield beam which are connected to the side frames to form a torsion resistant closed end structure.

In accordance with the objects of the present invention there is provided a unitized automobile body having a pair of side frames connected to transverse edges of a roof panel and a floor panel. Each side frame comprises an inner and an outer side panel having A-post portions and inverted Y-truss portions connected between roof rail portions and side sill portions, said Y-truss portions providing D-posts and rear sills extending from the side sills over the rear wheel house panels. A transverse cowl, firewall and windshield panel is connected to the A-posts to form a closed front end and a deep transverse rear beam is connected to the inverted Y-truss portions to provide a torsionally stiff open rear end automobile body.

The above and other objects of the invention, its features and advantages will be apparent from the following description of the preferred embodiment in which reference is made to the accompanying drawings:

FIG. 1 is a perspective view of the assembled automobile body of the present invention;

FIG. 5 is a perspective view of the left inner side panel;

FIG. 6 is an enlarged vertical section through the side sill taken at lines 6—6 of FIG. 1;

FIG. 7 is an enlarged horizontal section through the rear wheel housing taken at lines 7—7 of FIG. 1;

FIG. 8 is an enlarged vertical section through the rear wheel housing taken at lines 8—8 of FIG. 1;

FIG. 9 is an enlarged vertical section through the rear wheel housing extension taken at lines 9—9 of FIG. 1;

FIG. 10 is an enlarged horizontal section through the D-post and the upper rear quarter panel taken at lines 10—10 of FIG. 1;

FIG. 11 is an enlarged vertical section through the roof rail taken at lines 11—11 of FIG. 1 showing the hinge block for the rear door;

FIG. 12 is an enlarged vertical section through the side door header portion of the roof rail taken at lines 12—12 of FIG. 1; and FIG. 13 is an enlarged vertical section through the back door header taken at lines 13—13 of FIG. 1 showing the hinge block and the rear door.

DESCRIPTION OF THE PREFERRED EMBODIMENT

Figure 4:
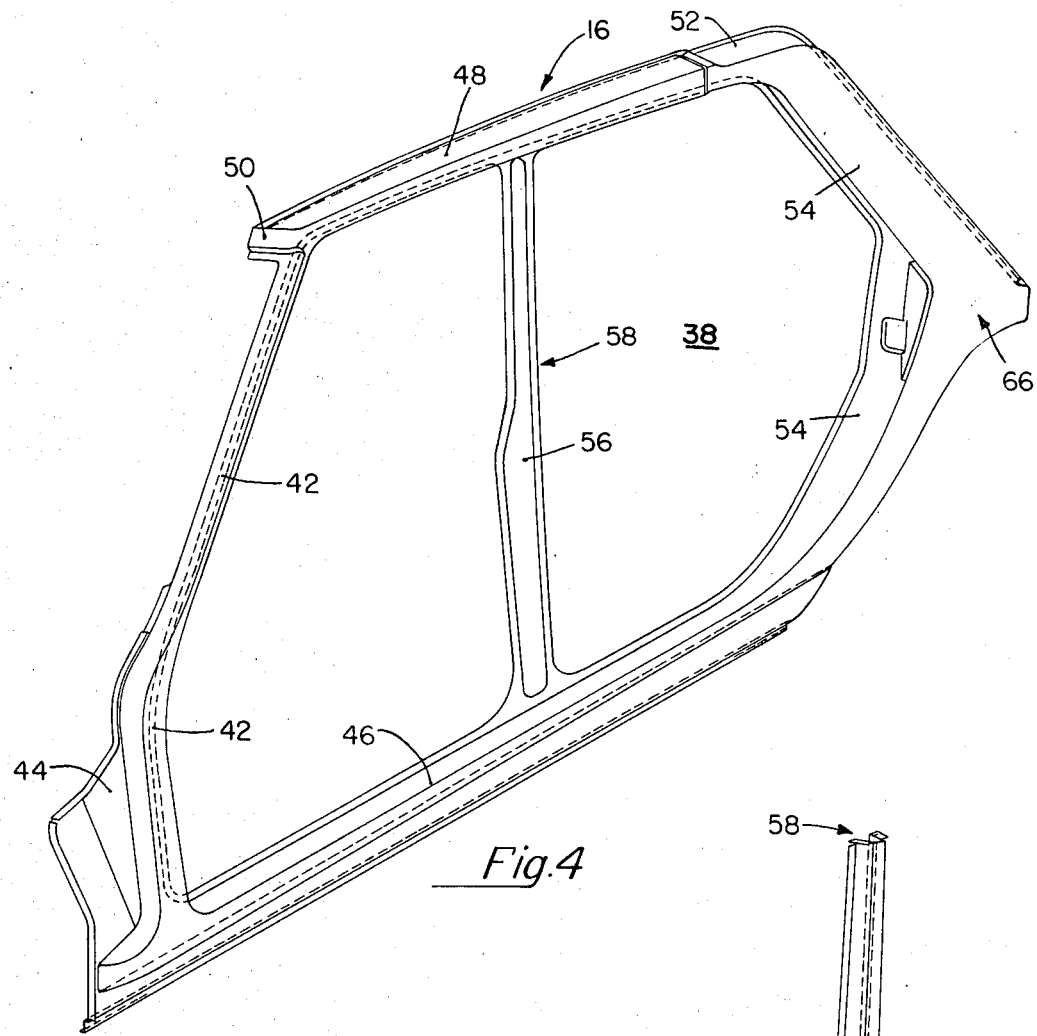
FIG. 4 is a perspective view of the left outer side panel.
Figure 3:
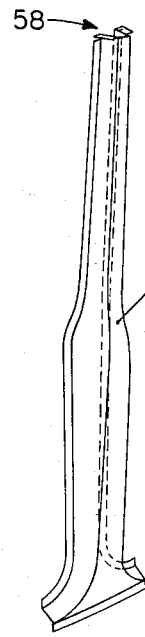
FIG. 3 is a perspective view of the outer portion of the left side B–C post.

FIG. 1 shows an assembled structural frame unitized body 10 according to the preferred embodiment of the present invention. The attached outside body panels further increase the strength, rigidity and torsional stiffness of the structural frame 10.

Body 10 comprises four sub-assemblies which are preferably fabricated separately and then connected to, or built up around, the floor assembly 12. After the right and left side frame assemblies 14, 16 and the cowl-windshield assembly 18 are properly connected to the floor assembly 12, additional reinforcements and panels are easily attached.

Floor panel assembly 12 comprises a front floor 20, a rear floor 22, a front foot board 24 and a firewall 26. Cross-beams 27, 28 formed as open box-sections, reinforce the front floor 20 and are connected to side frames 14, 16. Cross-beam 29 and a deep transverse rear beam 30, comprising an inverted arch-shaped back panel 31 and a rear panel 32, reinforce the rear floor 22 and are connected to the side frames 14, 16.

Side sill elements 34 are connected to floor assembly 12 and comprise a part of side sills 36 of the side frames 14, 16 in final assembly, as best shown in FIG. 6.

Each side frame 14, 16 comprises an outer side panel 38 and an inner side panel 40, preferably as shown in FIGS. 4 and 5, respectively. Outer side frame 38 is shown as a unit stamping comprising a side sill portion 46, an A-post portion 42 and side sill portion 46. The upper Adpost portion 42 continues into the roof rail portion 48 which is provided with a roof extension 50 at the junction thereof. The rearmost roof rail portion 52 is stepped down approximately one thickness of sheet metal so that an outer panel may be nestingly engaged thereon. Both, the roof rail portion 48 and the side sill portion 46 continue into a D-post portion 54. A B–C post portion 56 also extends between the side sill portion 46 and the roof rail portion 48. In this preferred embodiment the B–C post portion 56 is shown as forming an inner wall of the B–C post 58. The outer B–C post portion 60 is provided as a separate stamping. It should be understood that the side frame which comprises the unit stamping is preferably provided with an inner or an outer B–C post portion and the remaining portion of the B–C post 58 is provided as a separate stamping or as a part of mating side frame.

Figure 2:
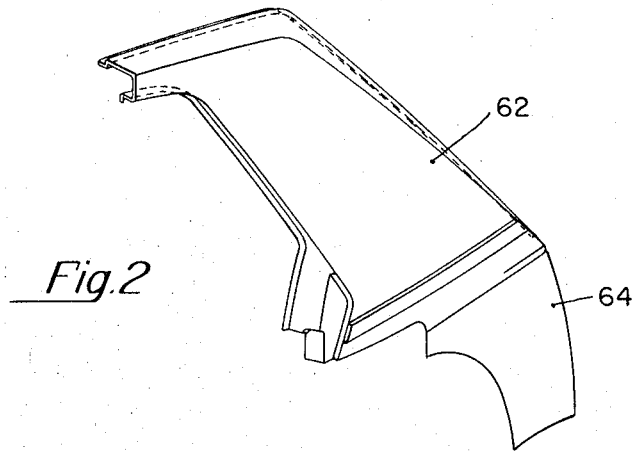
FIG. 2 is a perspective view of the upper and outer portions of the outside left rear quarter panel.

FIGS. 1 and 2 show an upper and outside rear quarter panel 62 and a lower and outer quarter panel 64, both of which are provided with appropriate flanges for being connected to the outer side panel 38. It will be noted that the lower and outer quarter panel 64 could be made as a part of the outer side panel 38.

The D-post portion 54 is structurally an extension of the side sill portion 46 and roof rail portion 48, and extends rearwardly to form an inverted Y-truss portion 66.

Inner side panel 40, as shown in FIG. 5, comprises several preformed stampings connected together as a sub-assembly which is attached to the outer side panel 38 to form a hollow left side frame 16. Although the A-post portion 68, roof rail portion 70 and Y-truss portion 72 are shown as separate parts, they could be made from a single stamping, however, it will be noted that the connections between these elements are made with overlapping joints which provide reinforcement at the areas of high stress. The Y-truss portion 72 comprises a side sill portion 74, a D-post portion 76 and a rear sill portion. The rear sill 78 is formed by the lower portion of the D-post portion 76 and the wheel house panel 80. The rearward extension of the rear sill 78 is formed by a lower and inner rear quarter panel 82 which may be a separate panel, as shown in FIG. 5, or may be formed as part of the inner side panel 40. The wheel house panel 80 fits intermediate the inner and outer panels 38, 40 and forms a closure of the arch of the inverted Y-truss portions 66, 72.

FIGS. 7 to 10 more clearly illustrate the Y-truss 86 formed over the rear wheel house panels 80 by the side frames. FIG. 10 is a section in plan view taken through the D-post 84 and shows the manner of attachment of the outside rear quarter panel 62 to the D-post 84 of the side frame 16. The vertical section of this D-post 84 (FIG. 8) shows the inner side panel 40 extending down to where it is attached to floor 22. Wheel house panel 80 forms an arch intermediate inner side panel 40 and outer side panel 38.

Upper and outside rear quarter panel 62 is shown attached to the outer side panel 38 at the belt line of side frame 16. Lower and outside rear quarter panel 88 is attached to side frame 16 preferably at the belt line overlapping or abutting upper rear quarter panel 62 so that an appropriate trim piece (not shown) may be employed to conceal the joint. It will be understood that other types of joints and trim pieces could be employed. In the preferred embodiment shown, the outside body panels, such as rear quarter panels 62, 88, are separated from the side frame 16 in the manner shown in FIGS. 7 to 10. Not only does such construction add considerable strength to the finished body, but it permits style changes to the outside body panels without the necessity of redesigning the basic structural frame shown in FIG. 1. For example, it will be noted that upper and outside rear quarter panel 62 may be designed to be fitted with a rear door, as shown, or may be designed to connect with different fixed rear panels having window and trunk spaces. The spaced construction of panels permits also accurate structural repair to damaged outside panels.

FIG. 7 is a section in plan view taken through the wheel house 80 showing the two branches of the inverted Y-truss 86. The D-post 84 forms the base and one branch of the Y-truss 86. The rear sill 78, which is formed over the wheel house 80 and becomes merged into the lower D-post, forms the arch of the Y-truss 86 and/or the other branch of the Y-truss 86.

The rearmost portion of the inner side panel 40 is shown in FIGS. 7 and 9 as being an integral part of the side panel 40, however, as explained with respect to FIG. 5, this panel may be made separately as a lower and outside rear quarter panel 84 similar to panel 64. The rear sill 78 is connected to back panel 31 of transverse rear beam 30. The outside rear quarter panel 88 is connected to a flange on the D-post 84 or the outer side panel 38 at its forward edge and connected to the rear beam 30 at the rearmost edge. Outside panel 88 is separated from the outer side panel 80 opposite outer and lower rear quarter panel 64, but may be connected thereto where mating flanges occur.

Having explained the preferred embodiment Y-truss 86 formed by an inner and an outer side panel, it will be understood that portions of panels designated 90, 92 and 94 in FIG. 7 may be made from a single stamping by changing the shape of the inner side panel shown in FIG. 5. When the rearmost portion of the wheel house 80 is made as a part of the inner side panel, the rearmost portion of the rear sill 78 is closed off, however, the inner side panel then forms a rigid angle-shaped member from the roof rail 70 to the transverse rear beam 30.

In the preferred embodiment shown in FIGS. 1, 11 and 13, there is provided a rear deck panel 96 in the form of a door pivotally mounted to the side frames 14, 16 at the roof rail 97. Door 96 has a pair of hinges 98 which are pivotally connected on a pair of pivot pins 99 on hinge blocks 100. A rear roof header 102 connects the roof rails 97 of the side frames 14, 16. Even though the rear door 96 offers little torsional resistance to the automobile body, it is substantially rigid at the open rear end because of the rigid inverted Y-truss 86 and the inverted arch-shaped transverse rear beam 30. Roof panel 104 and rear roof header 102 serve to transfer loads from one side frame to the other.

The front end of the automobile body, as already explained, is provided with a transverse cowl-windshield assembly 18 which includes a dash panel 19, a cowl panel 23 an a windshield panel 25. The assembly 18 is connected to the A-post 21 and the longitudinal shear panels 44 of the outer side panels 38. A windshield header 106 is connected between the roof extensions 50 to form an open frame with the side frames 14, 16 and the cowl-windshield assembly 18. When a windshield (not shown) is placed in this frame, the front end is closed as a structure and is substantially rigid and resists torsional deflections.

Having explained the structure of the preferred embodiment, it is apparent that the outside panels of a unitized body structure may be changed for appearance or body types without appreciably affecting the body-frame structure. An open rear end body has been illustrated which is provided with rigid structural side frames interconnected by substantially rigid and torsion-resistant cross-members. Accordingly, it will be understood that other embodiments and modifications of the structure shown are within the general scope of the invention described in the appended claims.

I claim:

1. A unitized automobile body structure of the type having side frames connected to a roof panel and a floor panel, characterized by inner and outer side panels connected to each other, each comprising a roof rail portion, a side sill portion, an A-post portion and an inverted Y-truss portion, the connected Y-truss portions diverging from each other from the roof panel to the floor panel to encompass a wheel house panel therebetween and to provide a tapered rigid column having juxtaposed wide shear panels, wheel house panels connected to said inner and said outer side panels at the inverted Y-truss portions forming therewith a supporting arch with the inverted Y-truss portions at the wide base of the rigid column, a deep front transverse beam connecting the A-post portions of the side panels, and a deep transverse rear beam connecting the inverted Y-truss portions of the side panels above the floor panel to provide a rigid rear end automobile body structure.

2. A unitized automobile body structure as set forth in claim 1, further characterized wherein said inverted Y-truss portions of said side panels form continuous hollow D-posts connecting said side sill portions and said roof rail portions.

3. A unitized automobile body structure as set forth in claim 2, further characterized wherein said inverted Y-truss portions form continuous hollow rear sills over the top of said wheel house panels connecting said side sill portions and said deep transverse rear beam.

4. A unitized automobile body structure as set forth in claim 3, wherein said inner side panels are provided with lower and inner rear quarter panels connected to the wheel house panels, the floor panel and the deep transverse rear beam.

5. A unitized automobile body structure as set forth in claim 4, wherein said outer side panels are provided with lower and outer rear quarter panels connected to the wheel house panels, the floor panel and the deep transverse rear beam.

6. A unitized automobile body structure as set forth in claim 5, which further includes outside rear quarter panels connected to said D-posts of said inverted Y-truss and to said deep transverse rear beam.

7. A unitized automobile body structure as set forth in claim 6, which further includes a rear roof header connected between said roof rails, and a rear deck panel forming a closure between said roof panel and said deep transverse rear beam.

8. A unitized automobile body structure as set forth in claim 6, which further includes hinge blocks connected to said roof rails, and a back door pivotally mounted on said hinge blocks and forming a closure for an open rear end automobile body structure. 9. 6. A unitized automobile body structure as set forth in claim 1, wherein said deep transverse rear beam comprises an inverted arch-shaped back panel connected said inverted Y-trusses.

10. A unitized automobile body structure as set forth in claim 9 wherein said deep rear transverse beam further comprises a rear panel connected to said arch-shaped back panel and said floor panel forming a hollow beam therewith.

11. A unitized automobile body structure as set forth in claim 1, wherein said front transverse beam comprises a firewall panel and an upper cowl assembly.

12. A unitized automobile body structure as set forth in claim 11, wherein said upper cowl assembly comprises a dash panel, a cowl panel and a windshield panel.

13. A unitized automobile body structure as set forth in claim 12, wherein said outer side panels of said side frames are provided with longitudinal shear panels connected to said floor panel and said firewall panel, said cowl panel and said windshield panel forming a rigid open box structure therewith.

14. A unitized automobile body structure as set forth in claim 13, wherein said A-posts are provided with transverse roof extensions, and a windshield header is connected to said transverse roof extensions forming a windshield frame with said A-post and said windshield panel.

* * * * *